United States Patent
Symoen et al.

(10) Patent No.: US 7,034,899 B2
(45) Date of Patent: Apr. 25, 2006

(54) RADIO COMMAND DEVICE

(75) Inventors: Lionel Symoen, La Roche sur Foron (FR); Laurent Gauthier, Taninges (FR)

(73) Assignee: Somfy SAS, Cluses (FR)

( * ) Notice: Subject to any disclaimer, the term of this patent is extended or adjusted under 35 U.S.C. 154(b) by 313 days.

(21) Appl. No.: 10/179,120

(22) Filed: Jun. 25, 2002

(65) Prior Publication Data
US 2002/0196376 A1 Dec. 26, 2002

(30) Foreign Application Priority Data
Jun. 26, 2001 (FR) .................................. 01 08589

(51) Int. Cl.
| | |
|---|---|
| H04H 5/44 | (2006.01) |
| H03J 1/00 | (2006.01) |
| G08C 19/00 | (2006.01) |
| H04B 1/18 | (2006.01) |
| G09G 5/00 | (2006.01) |

(52) U.S. Cl. ..................... 348/734; 334/8; 340/825.62; 340/825.69; 340/825.72; 455/151.1; 345/169
(58) Field of Classification Search ................... 334/8; 348/734; 455/159.1; 340/825.69, 825.72, 340/825.62, 310.01, 310.03; 345/169
See application file for complete search history.

(56) References Cited

U.S. PATENT DOCUMENTS

| | | | | |
|---|---|---|---|---|
| 3,852,740 | A | 12/1974 | Haymes | ....................... 340/416 |
| 4,348,582 | A | 9/1982 | Budek | ........................ 219/483 |
| 4,408,185 | A | 10/1983 | Rasmussen | ................. 340/310 |
| 4,771,232 | A | 9/1988 | Betts et al. | ..................... 324/77 |
| 4,847,542 | A * | 7/1989 | Clark et al. | .................. 318/560 |
| 5,264,823 | A | 11/1993 | Stevens | ....................... 340/310 |
| 5,352,957 | A | 10/1994 | Werner | ........................ 315/291 |
| 6,184,595 | B1 * | 2/2001 | Flegel, Jr. | .................... 307/114 |
| 6,326,758 | B1 * | 12/2001 | Discenzo | .................... 318/609 |

FOREIGN PATENT DOCUMENTS

| | | |
|---|---|---|
| DE | 24 28 173 | 1/1976 |
| DE | 198 14 366 | 10/1999 |
| FR | 2 518 335 | 6/1993 |
| FR | 2 728 615 | 6/1996 |
| FR | 2 772 171 | 6/1999 |
| FR | 2 798 449 | 3/2001 |
| WO | WO 98/37493 | 8/1998 |

* cited by examiner

Primary Examiner—Brian Zimmerman
Assistant Examiner—Scott Au
(74) Attorney, Agent, or Firm—Fay, Sharpe, Fagan, Minnich & McKee, LLP

(57) ABSTRACT

A control unit (10) superimposes command signals on AC power passing on a power line or network (40). A command unit (20) controls and powers an electrical load (50) such as a motor M. A command processor (26) receives radio frequency control signals at a first input (24) from an antenna (12) and a receiver/demodulator (22) and receives command signals from the power line at a second input (25) connected with a pulse shaping circuit (23). In a first, normal operating mode, the command processor controls the electrical load in accordance with signals received at the radio frequency input. In a second, special mode initiated power line command signals, the command processor at least temporarily blocks the execution of commands received at the radio frequency input.

21 Claims, 6 Drawing Sheets

RADIO COMMAND DEVICE

BACKGROUND OF THE INVENTION

The present invention relates to the art of remote control of electric devices that are powered by electric current. It finds particular application in a process which permits an irregular remote command over electric supply lines that power the electrical device but which is normally controlled by radio. It also finds particular application in an apparatus for implementing this process.

Similar electric devices are, for example, electric actuators for controlling solar shutters or other protection devices. The normal command is transmitted from a portable transmitter, a fixed transmitter, or a convenient meteorological sensor. In a normal radio command, it is also possible to initiate setup or adjustment modes which allow the installer or user to adjust the end position of a controlled operation, or to communicate the settings to new transmitters.

Using radio transmissions for this type of application presents a number of advantages. On the other hand, it is problematic in the unitary testing of the apparatus or their presets in production.

In effect, at the manufacturing stage, the products are generally not yet encoded. At this stage, a receiver obeys all transmitters. It is not possible to test many products in the same location unless the testing is absolutely simultaneous such that the commands for one could be executed by all. Or, the radio control devices could be put into different products. The sequence of tests for one product typically does not apply to other products. An inspection can include the precaution of electromagnetic isolation, for example with Faraday cages, but such equipment is costly.

It is the same when the products are commonly addressed. The problem exits when too many transmitters function on the same frequency and intermix with each other.

SUMMARY OF THE INVENTION

Thus, the command procedure or protocol with a remote radio control device, according to the invention, is characterized in that it activates a temporary inhibition means which temporarily blocks the execution of commands transmitted by radio.

According to a complementary characteristic, the inhibiting means for at least temporarily blocking the execution of commands transmitted by radio is activated by a direct action or remotely from the device.

According to another characteristic, the command means transmits a command signal over the power supply line.

According to other complementary characteristics, activation of the command means over supply wires causes an electrical interruption and/or the activation of the inhibiting means initiates the electric interruption.

The preceding contemplates two modes of operation. In a first or normal mode, commands are sent by radio transmission. In a second or special mode, commands are sent by the supply wires. In the second mode, as described above, at least one function resides in the blocking of the radio transmitted commands.

The invention also concerns a control and supply device which is connected electrically to the AC power supply lines and utilizing a control unit which includes at least:
 a radio receiver and demodulator,
 a command processor with at least one, radio input which is hard wired to an output of the radio receiver and demodulator while another input, the current signal input, is hard wired to an output of a voltage circuit,
 software modules which receive and execute the command signals from the radio input and/or the current signal input,
 and in that it implements one or the other of two modes of operation:
 a first, normal mode in which the software module is controlled by radio,
 a second, special mode in which the software module is controlled over the power supply line, which mode includes at least the function of blocking the implementing of radio commands.

In accordance with another aspect of the present invention, the apparatus is connected electrically to the AC power supply network and includes a control unit having at least:
 a radio receiver and demodulator,
 a command processor with at least one, radio input which is hard wired to an output of the radio receiver and demodulator while another input, the current signal input, is hard wired to an output of a voltage circuit,
 software modules which receive and execute the command signals from the radio input and/or the current signal input,
 and an inhibiting means for inhibiting command signals at the radio input.

According to a complementary characteristic, the device includes a software module which monitors the second, current signal input of the command processor, which software module responds to a preselected signal to initiate the second, special mode.

According to another characteristic, a third input to the command processor and the surveillance module at said input. The passage of the normal mode to the special mode is realized by the surveillance module upon detection of a preselected signal.

The return from the special mode to the normal mode can be accomplished by the detection of a preselected signal on the surveillance input or by the expiration of a selected time period, or by the termination of an extended interruption of the power supply.

The signals are communicated by the power supply line in the form of interruptions synchronized with the AC cycles of the current. The current supply module includes a means for executing activation and deactivation commands for an electrical load or motor.

Finally, the supply current module includes a means for executing setup commands. A first advantage of the invention is that it permits the same motion to be realized in different tests for the proper functioning of many normally radio controlled devices operating in the same location.

The invention applies equally to simple calibration of a product, for example, the end positions or intermediate positions along a race. The initial calibration or setup can also go to the overall program of the product. In effect, on the same generic base, many different products can differ by their management software. Due to the growth of memory capacity, some base products can contain many software applications. For reasons of standardization or programming, it can be advantageous to limit the personalization of products. The invention equally permits this type of product configuring at any stage of the cycle of production, stocking, or implementing, particularly those indicated above that have internal programs to be activated.

A second advantage is that it permits adjusting of these products and, more generally, the programs of products without communicating with the radio remote controls with which they are equipped.

Motorized products for different applications are similar products that have different behavior. Many products of different types with similar exteriors are processed along a common assembly line. The invention permits avoiding worker errors resulting from these similarities.

A third advantage resides in avoiding interference during operation. Each product functions only after receiving a proper code which identifies the product.

The communication protocol of the product in a calibration phase and a test phase is sufficiently simple to be implemented by one of ordinary skill. It is also usable for large manufacturing facilities which interface with the networks of client enterprises. It is important that programming at the time of manufacturing is not erased in a subsequent operation, for example, while adjusting ends of a course in a factory integrating a radio controlled motor in a product of its own, such as a shutter opener. The invention allows different program levels of the program for calibrating or testing the product and creating commands which are unique and which cannot be overridden.

A fourth advantage resides in the possibility of blocking levels of the program which can be implemented and the activation of the associated protocols of each level.

Products can be identified in other ways such as by a simple label, which often is lost or obscured when the product is installed. It would be useful to know, for example, the number of operations already programmed into an installed product. The bi-directional radio means permits effective communication between a product and an interrogation console, but at a high price.

A fifth advantage is that it also allows a product to be interrogated for its type or for the life expectancy of its parts.

The invention also includes a communication unit provided at a short distance, with wires for supplying current. Between a radio control product and a programmable interruption device for the power supply, a sequence of commands are transmitted that bring about an operation. It includes at least one mode of operation during which the radio orders cannot be put into practice when the unit is put in a communication mode over the power supply wiring.

According to the invention, the command processor of the product includes at least one input linked directly to the current supply and one input linked to a radio demodulation circuit, a software module for processing the radio input when operating in a normal mode of functioning, a module supplied by a current circuit input for activating a special mode, and a software module for monitoring the current circuit input which is activated to initiate the special mode in response to a preselected command signal and to permit return to the normal mode after a predetermined duration, on the reception of a second preselected command signal.

Other characteristics and advantages are described below.

It is known to control electrical loads and to communicate with products apart from information transmitted by current and similarly with loads by a radio communication link. French Patent No. 2,728,615 describes a device embodied in a commercial product by Bubendorff Company under the name "id" for radio communication and by a line for carrying current.

U.S. Pat. No. 3,852,740 describes an alarm in association with radio/current control. Command with the current is done at a high frequency on a power line carrier.

The technique of communicating on current using a power line carrier is rarely used. It is necessary for transmission and reception electronic apparatus to include a modulator/demodulator and a signal detector which gives this type of device a high cost as compared to radio transmissions.

The preceding applications in the framework of the invention often interrupt the supply of current for a very short duration and most often at the neighborhood of the zero crossing of the sinusoidal current. In the prior art, these devices are not normally controlled by radio.

In U.S. Pat. No. 4,348,582, the line is short-circuited to transmit a bit 1 which, is not effective during a very short interval of time when the supply voltage is in the neighborhood of zero.

In U.S. Pat. No. 5,264,823, the circuit is opened for a short duration in the neighborhood of the zero crossing at the leading edge of a rising and descending cycle to transmit the bit 1; without interruption is the bit 0. A short preceding interruption is also used by U.S. Pat. No. 4,771,232.

U.S. Pat. No. 4,408,185 also uses the partial interruption of the supply.

In German Patent No. DE 24 28 173, one embodiment interrupts the AC supply line for at least a half cycle.

French Patent No. FR 2,518,335 discloses a teletransmission procedure characterized in that it chooses, like an interrogation of the line, to cut two consecutive current cycles.

French Patent No. FR 2,798,449 describes a means of addressing and controlling many devices apart from information communicated by many consecutive interruptions of the power current.

French Patent No. FR 2,772,171 describes an analysis of the particular disappearance of the power current for two cycles, but simply for entering a setup mode.

Finally, International Patent Application No. WO 98/37493 makes use of a programming system which replaces the normal command box for going to a programming mode and/or the transfer of data and which permits the writing of the data from a microcomputer to a microprocessor and an EEPROM or the inverse. In this device, relative to a power controller for a continuous current motor, one does not find a radio receiver. It is not seen that, in the programming mode, the telecommunication receiver does not function. The disclosed device does not foresee the possibility of two command modes communicated on two different medium, each exclusive to itself at least in a given mode.

If those different communication procedures for the interruption of the supply line current are known to those of ordinary skill in the art, no one thinks to use them in a device which is normally commanded in a radio receiver for giving priority to the line current command to enter a communications mode which allows the solving of a host of problems in the manufacturing industry for radio command devices, like those described above.

Implementing the present invention needs only supplemental passive components on each product and therefore has a modest increased cost.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

In the embodiments which follow, various devices for implementing the present invention are described.

Figure 1:
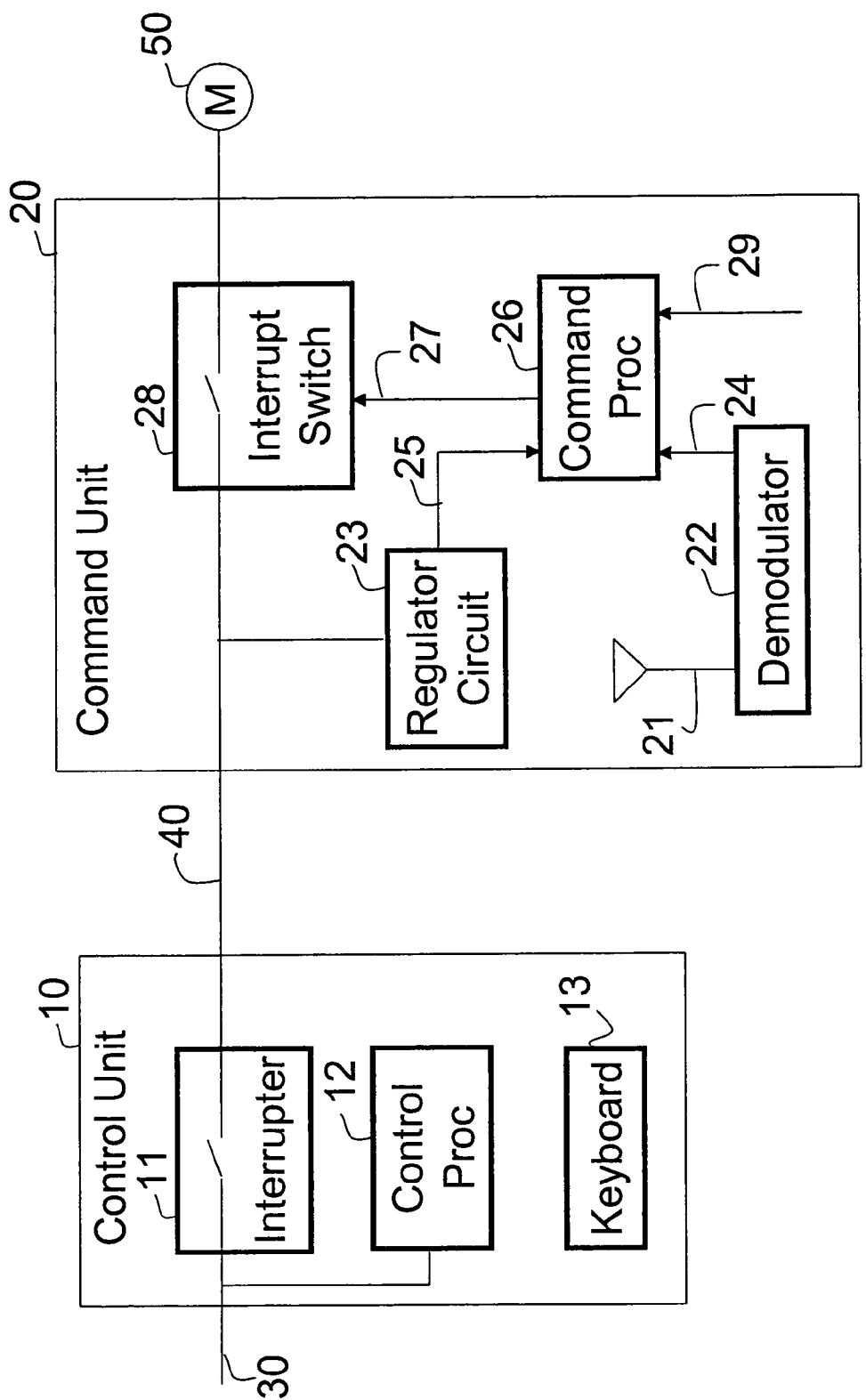
FIG. 1 is a diagram of an electronic device in accordance with the present invention.

The schematic shown in FIG. 1 includes a control unit or console 10 which relies on an electrical interconnection 40 to a command unit 20 which controls an electric load 50 such as a motor M.

The control unit 10 is connected to an AC or alternate current supply 30 in such a manner that it causes interruptions in the current supplied to the command unit 20.

The control unit 10 includes a uni-directional or bi-directional controlled interrupter 11 whose opening is synchronized to the supplied AC current frequency and is controlled in accordance with a control sequence by a control processor 12. The control processor 12 is controlled by either a keyboard or an automatic programming unit 13. Under the control of the automatic programming or keyboard unit 13, a succession of breaks or gaps are caused in the AC line current which define elementary command signals or bits.

According to the complexity of the transmitted commands, the corresponding control signal can be commanded to contain many elementary signals or bits and identifiers of a beginning and end of each complex signal segment which is made up of elementary signal components.

The encoding can be of the known configuration for such transmissions like, for example, RS232. In the parlance of those of ordinary skill in the art, the command signal includes, for example, a start bit SAB, four information bits B3, B2, B1, B0, and a stop bit SOB.

The programming of the control processor 12 to obtain a desired sequence apart from the chosen protocol is well-known in the art. According to a preferred embodiment, at most one information bit is transmitted during a current cycle.

The electrical interconnection 40 which leads from the control unit 10 powers the command unit 20. The command unit 20 also has an antenna 21 and a radio signal receiver and demodulator 22 whose output is connected to a first input 24 of a command processor 26. The command processor has at least a second input 25 connected to an output of a circuit 23 which shapes the AC signal from the electrical interconnection 40 into pulses. In order not to make FIG. 1 too complex, optional electrical voltage supplies other than from the electrical interconnection 40 are not illustrated. A third input 29 of the command processor 26 is also contemplated. This third input is connected with an externally actuatable switch contact which can be controlled by a magnet or could be replaced by the programmed output of a sensor.

An output 27 of the command processor 26 controls an interrupter switch 28 which interrupts electric power to the electrical device 50. In the embodiment of FIG. 1, the electrical device is, for example, a motor M in such a manner as to provide a dual control to the motor to operate in either direction.

The command processor 26, the function of which is illustrated in a schematic manner in FIG. 2, has a memory programmed in a manner which provides the functions explained below.

A software module 61 examines the second input 25 and compares it with a recorded configuration to determine if an interruption on the power line is interpretable as a communication signal. According to the result of this analysis, a first discriminating test 62 directs the program toward an execution module of a line signal processing section 63 for processing a line signal segment or directs an execution module of a radio signal processing section 64 to acquire and process a control radio-signal.

In an alternate embodiment, the software module 61 can examine the third input 29 rather than the second input 25 which allows initiating a special mode by another medium than by the transmitted signal on the supply line.

Following the processing section 63 which permits the acquisition of electric line signals is a second discrimination test block 65 that determines if an end of message signal has not been detected in the current message. The second test 65 can be replaced or overridden or superseded by the detection of a change-of-state on the third input 29.

Execution of the program of the execution module of the processing section 63 can also be terminated by a prolonged cut in the supply current. When power is restored, the program is restarted by the software module 61.

Figure 3:
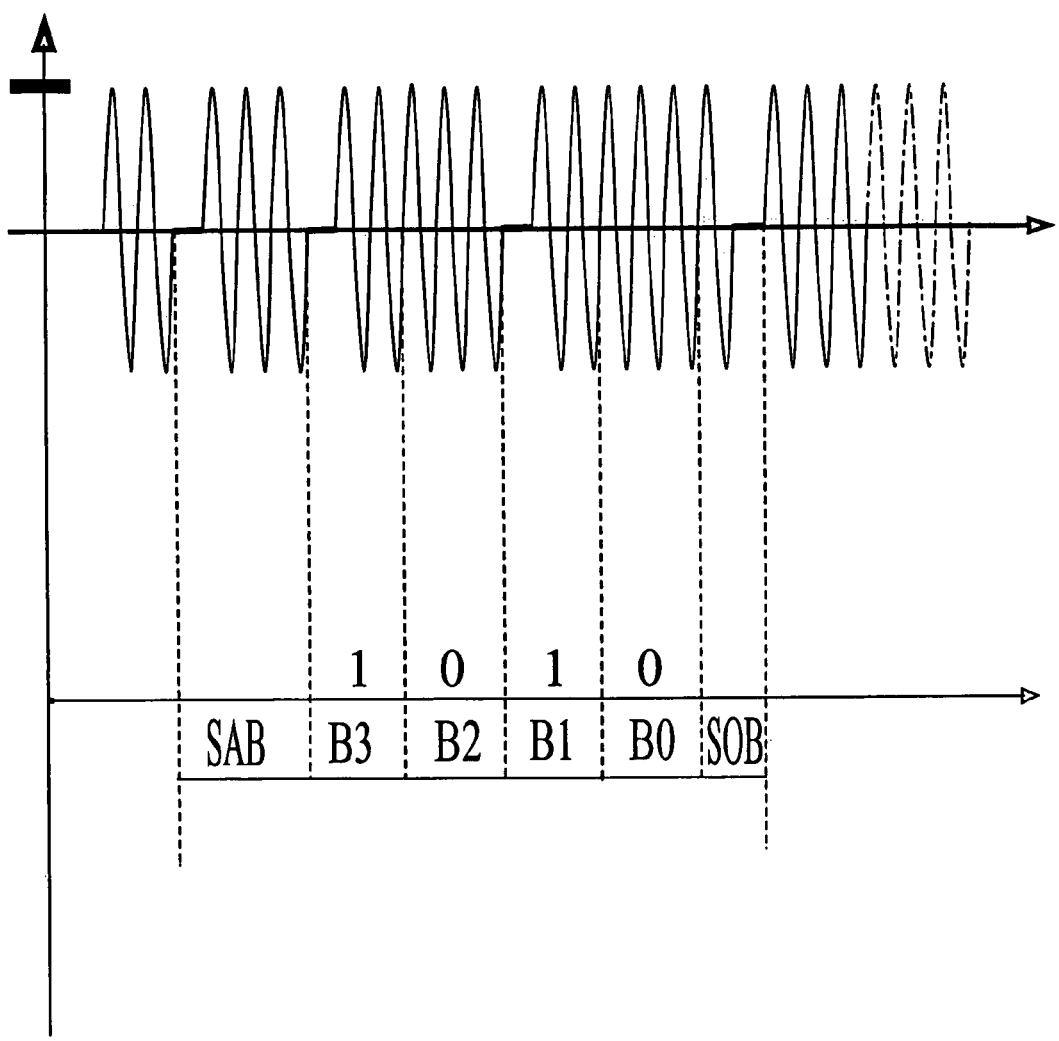
FIG. 3 illustrates an exemplary control waveform.

FIG. 3 illustrates an example of a complete command signal. In the embodiment of this example, a bit is transmitted in three cycles. A base state corresponds to the transmission of all cycles; whereas, a high state cuts the complete cycle. The control signal includes a word of four bits framed by a start indicator SAB and an end of word indicator SOB. Depending upon the complexity of the command, a complete message may include many words.

In the illustrated form of the communication, the output of the transmission is slow, which normally makes it inappropriate for a control application of a motor and of precision position adjustments or other applications where stopping is to be precisely controlled. Although the present invention uses a mode of communication which is slow, it can intrinsically satisfy one constrained strength; that is, the instantaneous stop.

It must be remarked that those skilled in production automation and control can adjust to a command console which waits many tens of seconds for an order to be executed, provided it takes action in the proper order, but not for an order to stop.

By contrast, an order to stop can be executed immediately. It is the present case, since an order to stop is not transmitted according to the same protocol, but simply by opening the electrical connection 40.

Figure 4:
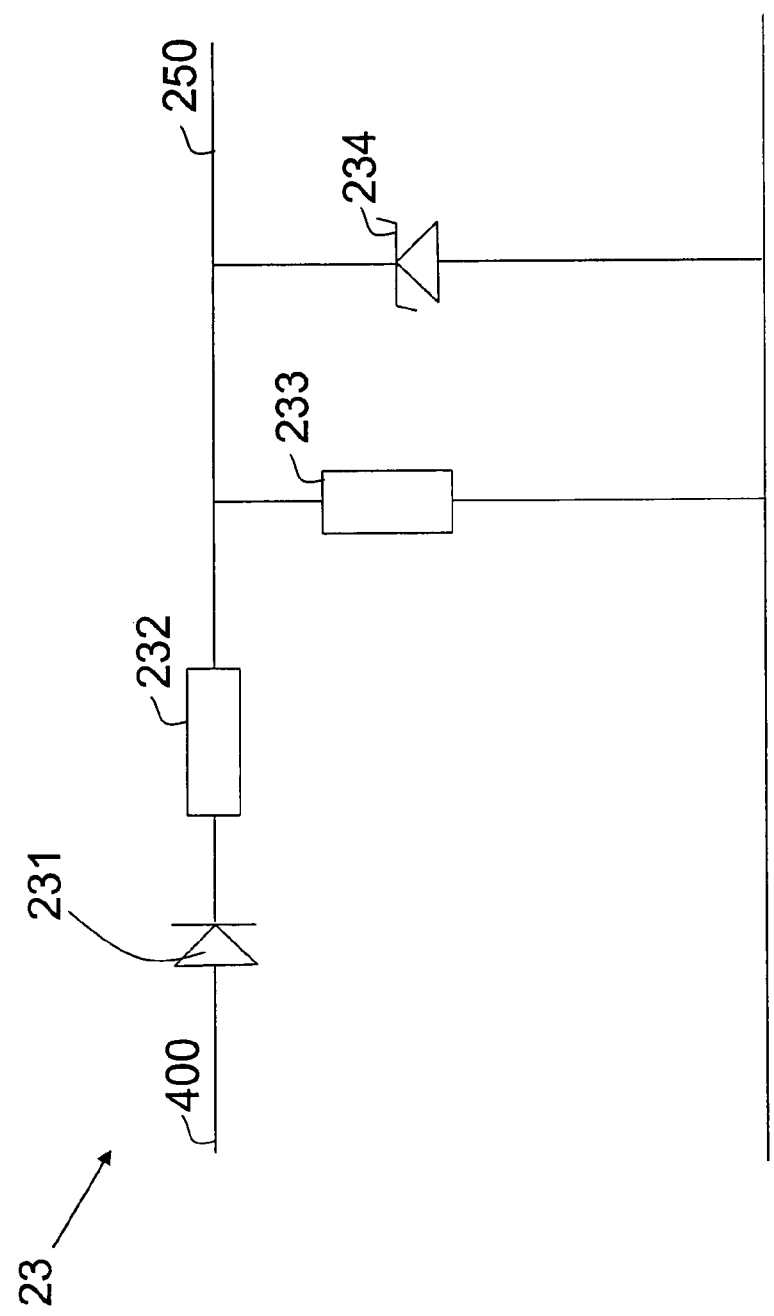
FIG. 4 shows a preferred embodiment of a surveillance circuit for monitoring the supply current.

FIG. 4 illustrates an embodiment of a surveillance circuit 23 which includes, for example, a simple resistance bridge 232, 233, and advantageously, a zener diode 234 for generating rectangular voltage pulses as the line current 40 straightened by a diode 231. In this manner, the circuit 23 turns the line current into a series of square pulses whose timing (spacing) is controlled by the control unit 10.

Figure 2:
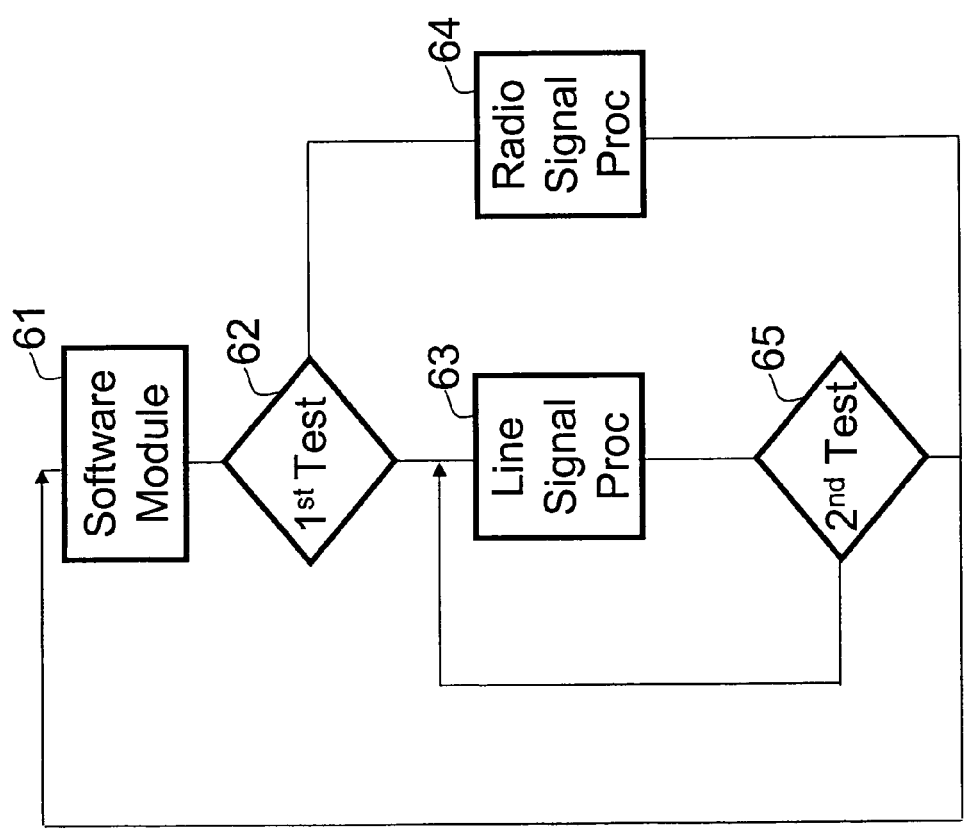
FIG. 2 is a functional diagram.

If the command unit 20 illustrated in FIG. 2 includes a transformer or other reducing device for the current supply, the supply line of circuit 400 is advantageously connected at the output of this transformer.

Figure 5:
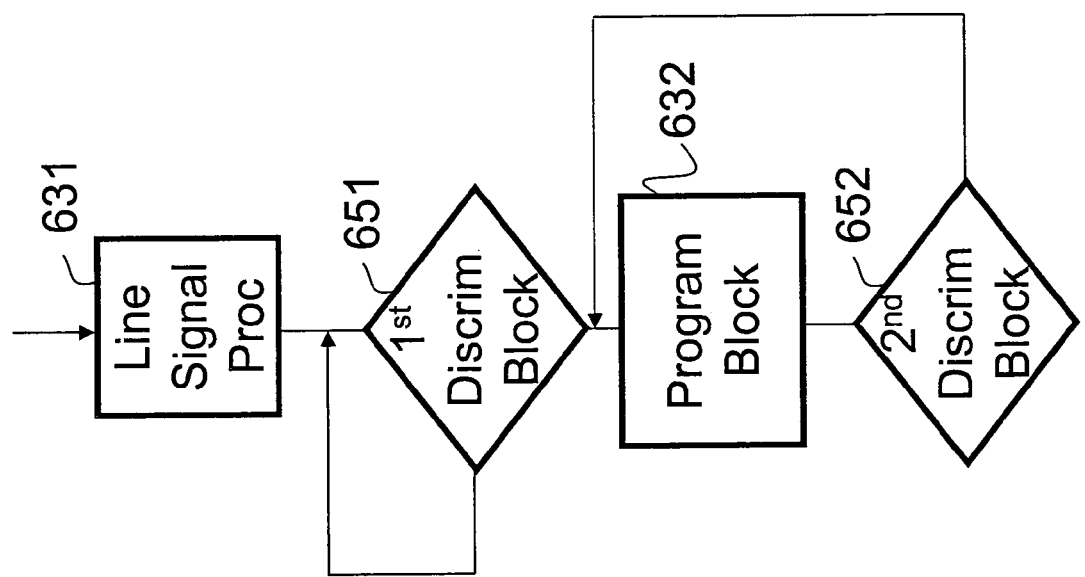
FIG. 5 is a functional overview illustrating a preliminary identification.

FIG. 5 illustrates an alternate embodiment of the functioning of the command processor 26 illustrating in a schematic way in abbreviated form by FIG. 2 relating to the acquisition and processing of a signal segment. According to this embodiment, the line current processing module 63 is replaced by a module 631, while the discriminating block 65 is replaced by a discriminating block 651. The module 631 permits information signal acquisition following a start code in the current signal. The contents of this information signal is compared by the discriminating block 61 with an identifying code of the type motor stored in a permanent memory of the processor. If the code read by the circuit corresponds to the identifier, then the test block 651 permits passage to a program block 632 and the acquisition and supplying of the following commands. If not, the program loops and the device remains insensitive to all of the actions as well as to radio signals until a prolonged break in the current allows reinitiation.

It is to be appreciated that a reverse interruption which could allow, for example, a change at the second input 25 of the status which is relied upon as the output of the circuit 23 to be put in form near a situation where the high point or the low point of the supply signal can be relied upon by the command processor 26. Thus, the software module 61 could look at the second input 25, for the occurrence of a change in the synchronization of the continuous voltage signal to be interrupted as an order to change into a special mode.

It is therefore possible to avoid, if many types of motors are made or tested on the same equipment, a motor obeying a sequence that is not appropriate for the tested model.

A concern of controlling normally radio controlled motors by a means insensitive to coupling cannot completely prevent the test of radio function at a production site, it could only fail to verify that it functions well. The importance is that the output radio commands are not executed by the device to which they are addressed and without which it could be inevitable to have a mediocre matching.

This can be achieved simply by outputting from the control circuit output command signal or the power line to only the motor intended to receive the radio signal command. The mode section ("output section") enables only the selected motor to receive radio signals or blocks all other motors.

But it is clear that one skilled in the art can well see that for this purpose, a command signal, for example, called "a radio authorization window", can be transmitted on the current line which authorizes the execution of a single order received by radio or a limited number of commands. The mode circuit can return automatically to the normal mode as soon as the radio commands are executed. Alternately, one product at a time can be placed in the test mode for a preselected short duration, by the use of this radio command window, and avoid interruptions by all other products during the test.

In a general manner, in an active time, the supply current module 23 permits the transmission of orders by the current line. It is therefore necessary to activate an inhibiting program to at least temporarily inhibit commands transmitted by radio. Accordingly, an organization of software programs is implemented which carry out the function of temporary exclusion. For example, one skilled in the art can write a program for the processor 26 in a manner which it performs a received program as well as orders transmitted on the current line while an inhibition program blocks the carrying out of radio commands. This inhibition program for radio commands can be activated, for example, by reception of commands by line circuit signals.

The inhibition of the transmission by radio can be accomplished by passing by at "0" a variable RAD normally at "1".

Figure 6:
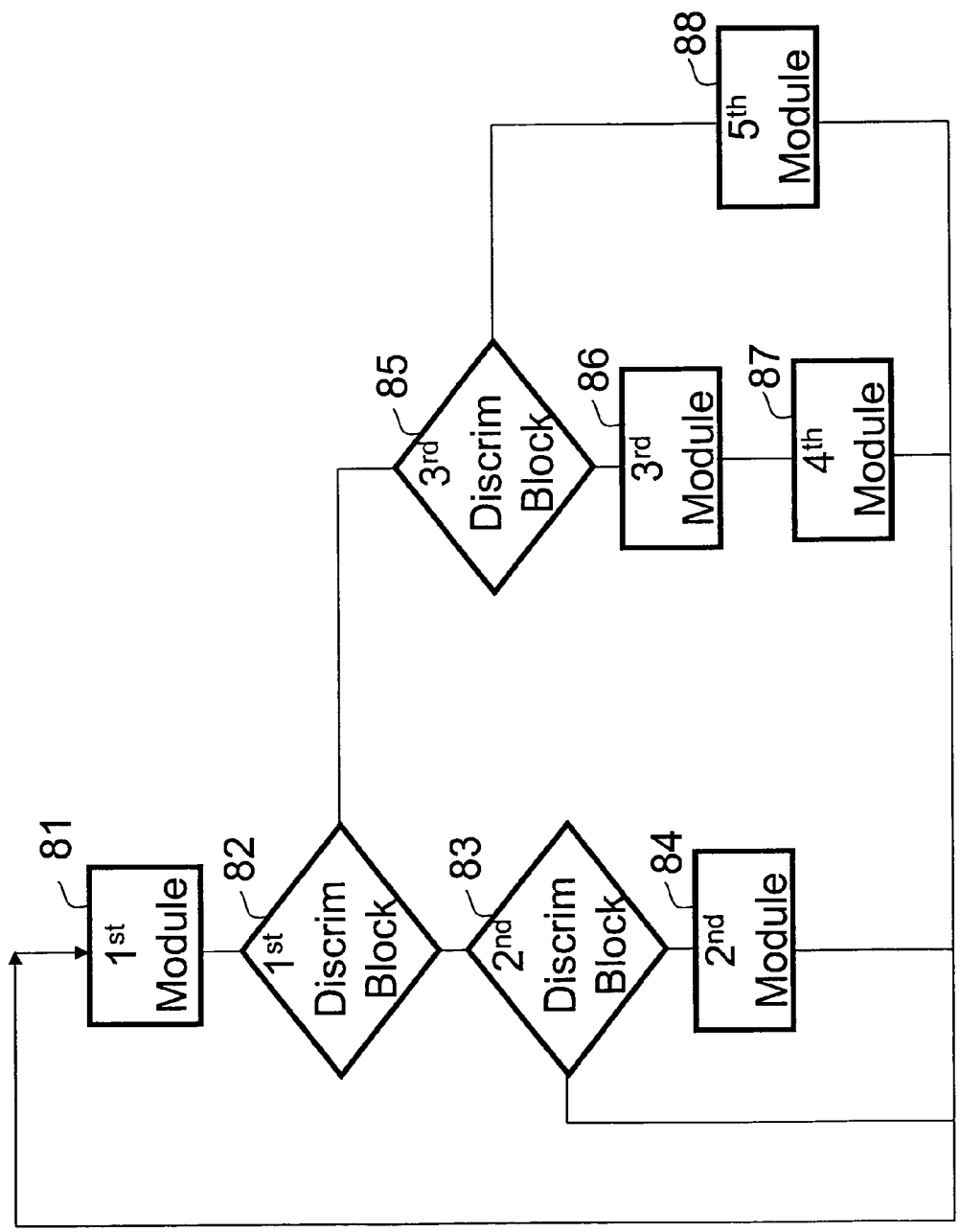
FIG. 6 is a functional diagram illustrating an alternate embodiment.

FIG. 6 illustrates a logic or program architecture. According to FIG. 6, a software module 81 is a reception program for radio and line current commands. The next program is a test of the origin of the received order by a discrimination block 82. Based on the result, this discriminating block directs the order to discriminating block 83 if the order is received by radio and to the discriminating block 85 if the order is received on the current line.

The block 83 proceeds to a test on the value RAD. If the value is "0", the signal from software module 81 is blocked and the order transmitted by radio is therefore not executed, but if the value RAD is equal to "1", it is directed to a module 84 which executes the radio command and loops back to the module 81.

The block 85 tests if the received command is a "end signal" command. If "YES", it goes to module 88 which authorizes a new radio command by putting a "1" for the variable RAD, then it blocks further communication to the module 81.

If "NO", it goes to a module 86 that executes the line current command, then a module 87 blocks the radio commands by putting a "0" in the variable RAD, thus blocking communications with block 81. In the case of a reception of a first line current command, the execution of radio commands is blocked. Their function is restored upon receipt of a line signal end command. In the same manner, an authorization command can be identified for a single radio command or, a limited number of commands, and/or a determined time window.

Finally, according to another embodiment supported by FIG. 6, the discriminating block 83 could test this time the state of input 29 relying on an interrupter switch activated externally as described in FIG. 1. According to the state of the extend switch, used in place of the variable RAD, the radio commands are or are not executed. The modules 87 and 88 then become ineffective.

It is understood that the importance of the invention is that there is at least one functional stage during which the special mode is activated and the commands of the normal mode are not acted upon.

It is clear without further explanation that the proceeding description permits one of ordinary skill in the art of radio control motors:

the simultaneous testing of many controls individually at the same time with the control unit 10 by watching the signals giving the rotation command for direction 1 and direction 2;

the setting of a current stop position as an end of the path, by watching for a set-up code FCH or FCB;

setting a current stop position as a specific intermediate position by watching for a set-up code FCI;

the configuration according to a logic module A, B, . . . , by watching for a configuration code CONFA, CONFB, . . . .

Moreover, it is possible to address an interrogation code to the motor so that it responds to a succession of fast actions of go-and-come instructions given by the code, as well as a greater number given by successive codes.

In short, it is within those skilled in the art to terminate the diverse commands by a lockup or stop identifier that permits coming together of one configuration that comes to be recorded.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A control method for controlling a radio controlled device, which is powered by at least two electric wires of an AC means and controls an electrical motor, characterized in that:
   with a control means, sending a command over the electric wires, which control means controls the electrical motor;
   with an inhibition means, in response to an inhibit command received at least one of (a) over the electric wires and (b) from an externally activatable switch contact independent from the radio receiver at least temporarily blocking the execution of commands transmitted by radio while not blocking commands transmitted over the electric wires.

2. The method according to claim 1 characterized in that: the inhibiting means which at least temporarily blocks the execution of commands transmitted by radio is activated by one of direct action and remotely from the controlled device.

3. The method according to claim 1 characterized in that: the control means includes an electrical interrupter which interrupts an electrical signal on the electric wires.

4. The method according to claim 1 characterized in that: activation of the inhibiting means results in use of an electrical power interrupter.

5. The method as set forth in claim 1 characterized in that the radio controlled device has two modes of operation:
   in a first mode, commands are transmitted by radio transmission; and,
   in a second mode, commands are sent by at least one of the externally activatable switch contact and the electric lines, the second mode of operation at least temporarily blocks the execution of the commands transmitted by radio.

6. A command device which controls and powers an electrical load and connected with an AC network through a control unit, the command device including:
   a radio signal receiver and demodulator;
   a command processor with at least one input connected to an output of the radio receiver and demodulator and a second input connected to an output of a circuit that shapes AC electric pulses;
   first and second modules which execute command signals received at least at one of the first and second inputs to the command processor, in a first, normal operating mode, the first module is responsive to radio signal commands received at the first input and in a second, special mode, the second module responds to commands from the second input to execute at least one of (1) a first operating function, and (2) temporarily blocking execution of commands transmitted by radio.

7. A command device which controls and powers an electric load with AC electric power from electrical supply lines which have passed through a control unit, the command device including:
   a radio signal receiver and demodulator;
   a command processor with at least one radio signal input connected to an output of the radio receiver and demodulator and a power signal input connected to an output of a pulse shaping circuit connected with the power lines for shaping pulses of the AC electric power;
   the command processor including software modules which receive command signals from the radio input and the power signal input and execute the received commands; and,
   an inhibiting means for blocking the execution of commands received at the radio input.

8. The command device according to claim 6 further including:
   a surveillance module connected with the second input of the command processor to monitor for command signals calling for the second operating mode.

9. The command device according to claim 6 further including:
   a third input to the command processor, the command processor includes:
      a surveillance module connected with the third input to monitor for command signals calling for the second operating mode.

10. The command device according to claim 6 wherein returning from the second operating mode to the first operating mode is caused by at least one of:
   detection of a command signal calling for such return;
   the passing of a time period; and,
   the end of a duration in which power is not supplied on the AC network.

11. The command device according to claim 6 wherein a controlled electrical load includes a motor.

12. The command device according to claim 6 wherein the control unit generates current command signals by interruptions to the AC current pulse synchronized to alternating cycles of the AC current.

13. The command device according to claim 6 further including:
   a means responsive to the second module for selectively supplying/blocking a supply of electrical power to the controlled electrical load.

14. The command device according to claim 6 wherein the second module includes:
   a means for executing set-up commands.

15. The command device according to claim 7 further including:
   a software module connected with the power signal input of the command processor to monitor for command signals calling for a special operating mode in which the inhibiting means blocks the execution of commands received at the radio input.

16. The command device according to claim 7 further including:
   a third input to the command processor, the command processor including:
      another software module connected with the third input to monitor for command signals at the third input calling for the special operating mode.

17. The command device according to claim 15 wherein returning from the special operating mode to a normal operating mode is caused by at least one of:

detection of a command signal calling for such return;

the passing of a preselected time period; and, the end of a duration in which power is not supplied on the electrical supply lines.

18. The command device according to claim 7 wherein a controlled electrical load includes a motor.

19. The command device according to claim 7 wherein the control unit generates current command signals by interruptions of the AC power synchronized to AC cycles of the AC power.

20. The command device according to claim 7 wherein the inhibiting means is responsive to one of the software modules for selectively supplying/blocking a supply of electrical power to a controlled electrical device.

21. The command device according to claim 7 wherein one of the software modules includes:

a means for executing set-up commands.

* * * * *